US006725105B2

(12) United States Patent
Francis et al.

(10) Patent No.: US 6,725,105 B2
(45) Date of Patent: Apr. 20, 2004

(54) BUCKET SHAKEOUT MECHANISM FOR ELECTRO-HYDRAULIC MACHINES

(75) Inventors: John E. Francis, Raleigh, NC (US); Mark D. Shane, Garner, NC (US)

(73) Assignee: Caterpillar Inc, Peoria, IL (US)

( * ) Notice: Subject to any disclaimer, the term of this patent is extended or adjusted under 35 U.S.C. 154(b) by 580 days.

(21) Appl. No.: 09/726,878

(22) Filed: Nov. 30, 2000

(65) Prior Publication Data

US 2002/0065575 A1 May 30, 2002

(51) Int. Cl.[7] .................................................. G05B 15/00

(52) U.S. Cl. .......................... 700/75; 700/172; 700/257; 700/85; 318/592; 60/445

(58) Field of Search ................................ 700/75–77, 85, 700/282, 250, 257, 61, 63, 172, 186, 187, 188, 40; 701/50; 172/2; 414/699; 318/592–595; 60/445

(56) References Cited

U.S. PATENT DOCUMENTS

| | | | | |
|---|---|---|---|---|
| 4,779,416 A | | 10/1988 | Chatterjea et al. | |
| 5,235,809 A | | 8/1993 | Farrell | |
| 5,515,927 A | * | 5/1996 | Matsushita et al. | 172/3 |
| 5,564,507 A | * | 10/1996 | Matsushita et al. | 172/3 |
| 5,669,282 A | * | 9/1997 | Tanino et al. | 91/520 |
| 5,682,312 A | | 10/1997 | Rocke | |
| 5,702,227 A | | 12/1997 | Berg | |
| 5,765,594 A | | 6/1998 | Collins et al. | |
| 5,880,957 A | | 3/1999 | Aardema et al. | |
| 5,941,921 A | | 8/1999 | Dasys | |
| 5,950,141 A | * | 9/1999 | Yamamoto et al. | 702/41 |
| 5,968,103 A | | 10/1999 | Rocke | |
| 5,974,352 A | | 10/1999 | Shull | |
| 5,996,703 A | * | 12/1999 | Yamamoto et al. | 172/4.5 |
| 6,029,445 A | * | 2/2000 | Lech | 60/422 |
| 6,058,342 A | * | 5/2000 | Orbach et al. | 701/50 |

FOREIGN PATENT DOCUMENTS

| | | | | |
|---|---|---|---|---|
| DE | 3231544 A1 | * | 3/1984 | E21D/9/10 |

* cited by examiner

*Primary Examiner*—Anil Khatri
*Assistant Examiner*—Crystal J. Barnes
(74) *Attorney, Agent, or Firm*—Hancock Estabrook; Diana L Charlton; Jeff A Greene

(57) ABSTRACT

The present invention is a control system for conditioning movement of a work implement during a work cycle. In one embodiment, the control system comprises an electronic-hydraulic valve connected to the work implement and a computer system having a central processing unit and a memory device. The control system further comprises a mode control module stored on the memory device. The mode control module is generally adapted to detect whether the control handle of the work implement is signaling for operating in a smooth mode or an abrupt mode, and to output a control signal to the electronic-hydraulic valve to control operation of the work implement during the smooth mode or the abrupt mode. The mode control module comprises a smooth mode module and an abrupt mode module. The smooth mode module and the abrupt mode module are adapted to optimize movement of the work cycle during the smooth mode, and abrupt mode, respectively.

11 Claims, 4 Drawing Sheets

SYMBOLS i– i= FUNCTION #, WHERE 1=BUCKET, 2=STICK, 3=...,
I–INPUT(LEVER, SPOOL, ETC.)
X–NUMBER OF ZEROS CROSSED
Y–CRITERIA THRESHOLD
Z–CYCLE TIME
?–SHIFT CRITERIA VALUE
a–LEVER ANGLE
s–SPOOL DISPLACEMENT

BUCKET SHAKEOUT MECHANISM FOR ELECTRO-HYDRAULIC MACHINES

TECHNICAL FIELD

The invention relates generally to excavating machines and, more particularly, to a control system for an excavating machine.

BACKGROUND ART

When using electro-hydraulics on machines with buckets, the software is programmed to provide for smooth operation. When activating the valve through which such operation is controlled, the acceleration and deceleration of the bucket is reduced to give smooth starts and stops, improved stability, and less fatigue on structures and hydraulics. However, this causes a problem when trying to clean out the bucket.

With conventional machines, the operator ordinarily cycles the bucket back and forth in rapid succession to shake the dirt out. The present invention is directed to overcoming one or more of the problems or disadvantages associated with the prior art.

DISCLOSURE OF THE INVENTION

The present invention is a control system for conditioning movement of a work implement during a work cycle. In one embodiment, the control system comprises an electric hydraulic valve connected to the work implement and a computer system having a central processing unit and a memory device. The control system further comprises a mode control module stored on the memory device. The mode control module is generally adapted to detect whether the work implement is operating in a smooth mode or an abrupt mode, and to output a control signal to the electronic-hydraulic valve to control operation of the work implement during the smooth mode or the abrupt mode. The mode control module comprises a smooth mode module and an abrupt mode module, and a decisional mode. The decisional mode is generally adapted to detect whether the work implement is operating in the smooth mode or the abrupt mode. The smooth mode module and the abrupt mode module are adapted to optimize movement of the work cycle during the smooth mode and abrupt mode, respectively.

BRIEF DESCRIPTION OF THE DRAWINGS

The following description of the invention will better understood with reference to the accompanying drawings in which.

BEST MODE FOR CARRYING OUT THE INVENTION

Figure 1:
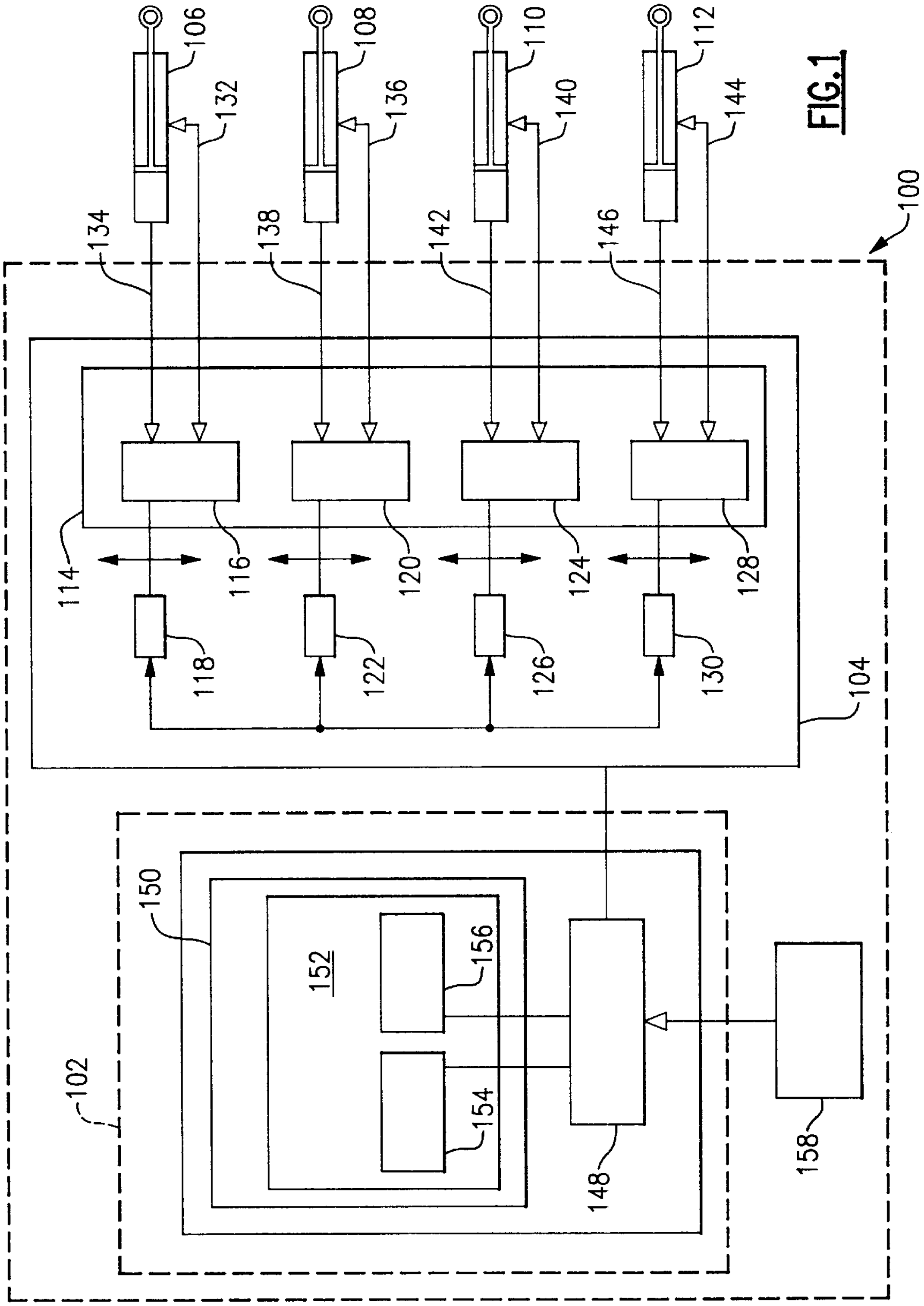
FIG. 1 is a high level block diagram showing the architecture of the control system of the present invention.

Referring to FIG. 1, there is illustrated a control system 100 for conditioning movement of a work implement (not shown) during a work cycle. The work implement may take the form of a variety of electrical and/or mechanical devices such a backhoe excavating machine or an end loader.

The control system 100 generally comprises a computer system 102 operable in response to movement of a joy stick 158 to control an electronic hydraulic valve 104. The computer system 102 and an electronic hydraulic valve 104 operate to control movement of the individual joints of a work implement using, for example, a swing hydraulic cylinder 106, a boom hydraulic cylinder 108, a stick hydraulic cylinder 110, and a bucket hydraulic cylinder 112 or loader lift/loader tilt cylinder, depending upon the particular configuration of the work implement with which the control system 100 is being used. For purposes of illustration, the control system 100 will be described with reference to its use with a loading bucket, but it is not to be limited thereto.

The electronic hydraulic control valve 104 generally comprises an implement control valve 114 having a swing spool 116 and a swing spool actuator, 118 to control movement of a swing casting or joint (not shown) of the work implement. The electronic hydraulic control valve 104 further comprises a boom spool 120 and a boom spool actuator 122 to control movement of a boom (not shown) of the work implement. The electronic hydraulic control valve 104 further comprises a stick spool 124 and a stick spool actuator 126 to control movement of a stick (not shown) of the work implement. The electronic hydraulic control valve 104 further comprises a bucket spool 128 and a bucket spool actuator 130 to control movement of a bucket (not shown) of the work implement.

The swing hydraulic cylinder 106 comprises a two-way fluid line 132 and a two-way fluid line 134 connected through the swing spool 116 of the implement control valve 114.

The boom hydraulic cylinder 108 comprises a two-way fluid line 136 and a two-way fluid line 138 connected through the boom spool 120 of the implement control valve 114.

The stick hydraulic cylinder 110 comprises a two-way fluid line 140 and a two-way fluid line 142 connected through the stick spool 124 of the implement control valve 114.

The bucket or loader lift/loader tilt hydraulic cylinder 112 comprises a two-way fluid line 144 and a two-way fluid line 146 connected through the bucket spool 128 of the implement control valve 114.

The computer system 102 comprises a central processing unit 148 and a memory device 150. The computer system 102 further comprises a mode control module 152 stored on the memory device 150. The mode control module 152 comprises a smooth mode module 154 and an abrupt mode module 156. While the use of a central processing unit 148 is preferred, it is to be understood that certain valves used in hydraulic systems may have a programmable module mounted on the valve, thereby eliminating the need for a central processing unit by using a memory device and/or mode control module mounted on such individual valves.

Figure 2:
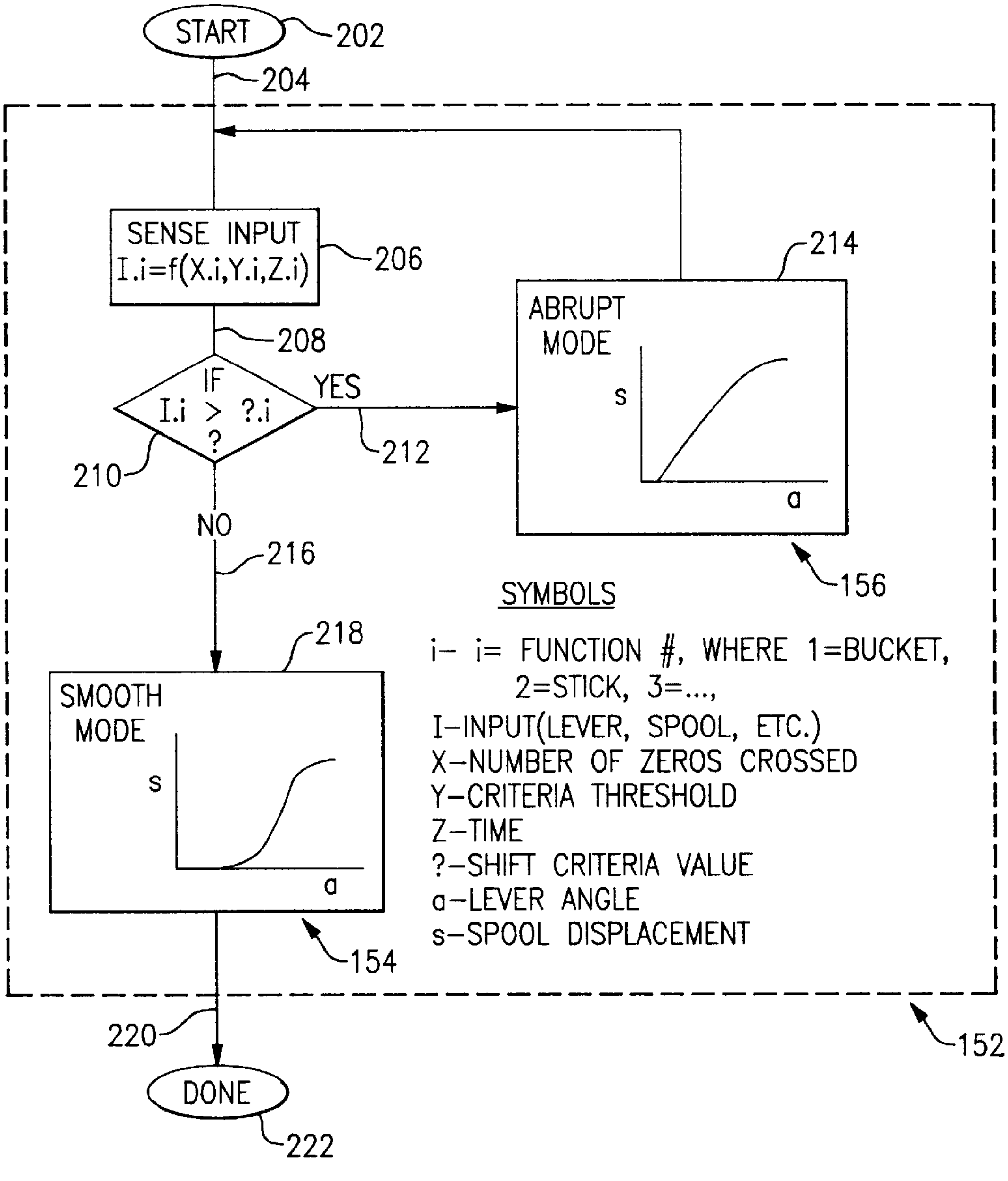
FIG. 2 is a high level flow chart showing the operation of a first embodiment of the mode control module of the present invention.

Referring to FIG. 2, a high level block diagram shows the operation of a first embodiment of the mode control module 152. As indicated by a start block 202, the mode control module 152 is enabled. Control is passed along a path 204 to execution block 206. As indicated by execution block 206, the mode control module 152 is adapted to sense the input level of the joy stick pod or lever as a function of the number of zeros crossed (X), the criteria threshold (I), and the time (Z) for each element of the work implement, namely, the swing casting, boom, stick, bucket or loader lift/loader tilt. Control is passed along a path 208 to a decisional block 210.

As indicated by decisional block 210, if the input level for the swing casting, boom, stick, and/or bucket is equivalent to a level indicative of an abrupt mode, then control is passed along a path 212 to the execution block 214. As indicated by execution block 214, the abrupt mode module 156 is adapted to condition movement of the work implement according to the abrupt mode as shown where spool displacement(s) is plotted against lever angle (A).

As indicated by decisional block 210, if the input level for the swing casting, boom, stick, and/or bucket is not equivalent to a level indicative of an abrupt mode, then control is passed along a path 216 to the execution block 218. As indicated by execution block 218, the smooth mode module 154 is adapted to condition movement of the work implement according to the smooth mode as shown wherein spool displacement(s) is plotted against lever angle (A). Control is then passed along a path 220 to a finish block 222. The mode control module 152 senses the movement of the control handle or lever 158 and sends a signal to the solenoid valve of the electronic hydraulic valve 104 of how much and how fast to shift the swing spool 116, boom spool 120, stick spool 124 and/or the bucket spool 128. Use of the electronic hydraulic valve 104 allows reduction in shock in the control system 100 reducing the speed at which the various spools shift. In other words, the curve of handle displacement versus fluid flow will not be a straight line, but a gradual curve so the acceleration of the implement is not so rapid. In the first embodiment, the operator continues to cycle the joy stick lever 158 in the abrupt mode as long as needed.

Figure 3:
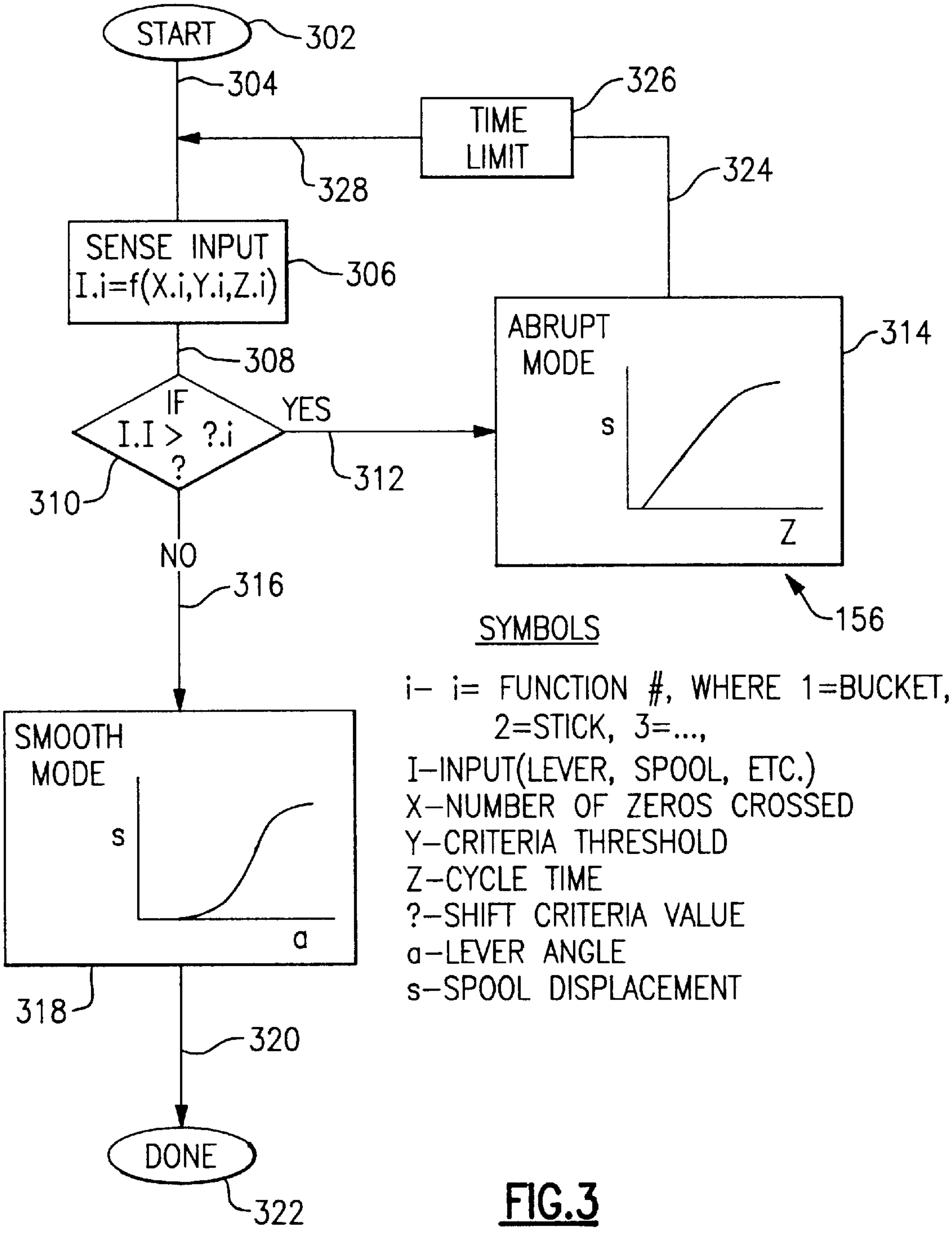
FIG. 3 is a high level flow chart showing the operation of a second embodiment of the mode control module of the present invention.

Referring to FIG. 3, a high level block diagram shows the operation of a second embodiment of the mode control module 152. As indicated by a start block 302, the mode control module 152 is enabled. Control is passed along a path 304 to execution block 306. As indicated by execution block 306, the mode control module 152 is adapted to sense the input level of the joy stick pod or lever as a function of the number of zeros crossed (X), the criteria threshold (I) and the time (Z) for each element of the work implement, namely, the swing casting, boom, stick and bucket. Control is passed along a path 308 to a decisional block 310.

As indicated by decisional block 310, if the input level for the swing casting, boom, stick, and/or bucket is equivalent to a level indicative of an abrupt mode, then control is passed along a path 312 to the execution block 314. As indicated by execution block 314, the abrupt mode module 156 is adapted to condition movement of the work implement according to the abrupt mode as shown where spool displacement(s) is plotted against lever angle (A). Control is then passed along a path 324 to an execution block 326 where the mode control module 152 keeps track of the time that the abrupt mode module 156 is enabled. The amount of time the abrupt mode module 156 is enabled can be varied.

Returning to decisional block 310, if the input level for the swing casting, boom, stick, and/or bucket is not equivalent to a level indicative of an abrupt mode, then control is passed along a path 316 to an execution block 318. As indicated by execution block 318, the smooth mode module 154 is adapted to condition movement of the work implement according to the smooth mode as shown wherein spool displacement(s) is plotted against lever angle (A). Control is then passed along a path 320 to a finish block 322. Unlike the first embodiment, in the second embodiment the operation of the abrupt mode is controlled by a time limit.

Figure 4:
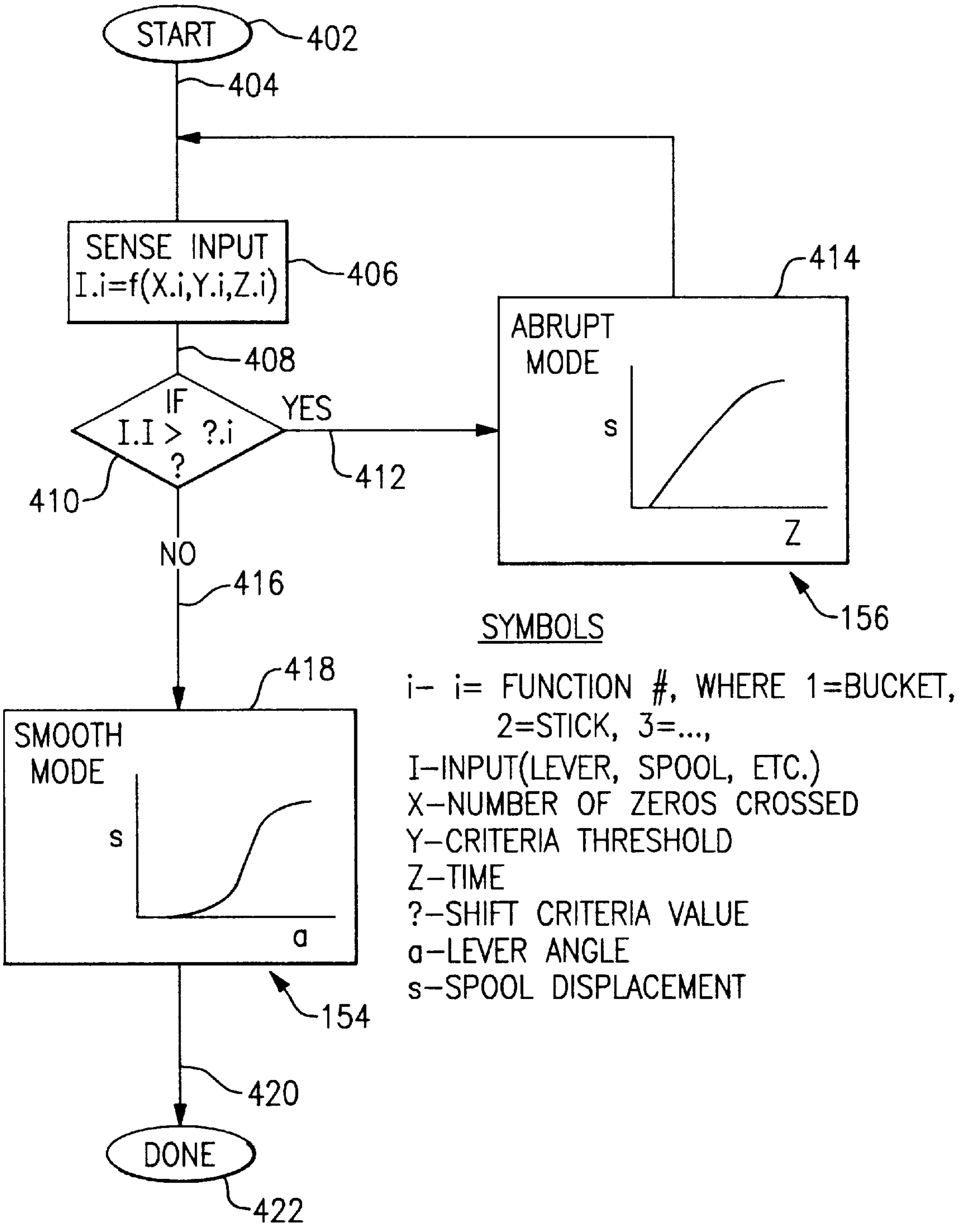
FIG. 4 is a high level flow chart showing the operation of a third embodiment of the mode control module of the present invention.

Referring to FIG. 4, a high level block diagram shows the operation of a first embodiment of the mode control module 152. As indicated by a start block 402, the mode control module 152 is enabled. Control is passed along a path 404 to execution block 406. As indicated by execution block 406, the mode control module 152 is adapted to sense the input level of the joy stick pod or lever as a function of the number of zeros crossed (X), the criteria threshold (I), and the time (Z) for each element of the work implement, namely, the swing casting, boom, stick and bucket. Control is passed along a path 408 to a decisional block 410. As indicated by decisional block 410, if the input level for the swing casting, boom, stick, and/or bucket is equivalent to a level indicative of an abrupt mode, then control is passed along a path 412 to an execution block 414. As indicated by execution block 414, the abrupt mode module 156 is adapted to condition movement of the work implement according to the abrupt mode as shown where spool displacement(s) is plotted against lever angle (A).

As indicated by decisional block 410, if the input level for the swing casting, boom, stick, and/or bucket is not equivalent to a level indicative of an abrupt mode, then control is passed along a path 416 to an execution block 418. As indicated by execution block 418, the smooth mode module 154 is adapted to condition movement of the work implement according to the smooth mode as shown wherein spool displacement(s) is plotted against lever angle (A). Control is then passed along a path 420 to a finish block 422. In the third embodiment of the mode control module 152, the operator can control the time duration of the abrupt mode.

INDUSTRIAL APPLICABILITY

The control system 100 of the present invention may be used in a wide variety of industrial applications where it is desirable to condition movement of a work implement between a smooth mode and an abrupt mode. Other aspects and features of the present invention can be obtained from a study of the drawings, the disclosure, and the appended claims.

What is claimed is:

1. A control system for conditioning movement of a bucket during a work cycle, the control system comprising:

(a) an electronic controlled hydraulic valve connected to the bucket and operable in response to an activating signal from an implement controller to effect movement of the bucket;

(b) said control system including a memory device operably connected to said electronic controlled hydraulic valve for controlling the operation thereof; and (c) a mode control module stored on said memory device, said mode control module automatically operating said bucket, in response to an input from said implement controller, in a one of a smooth mode and an abrupt mode and to output a control signal to said electronic controlled hydraulic valve to control operation of said bucket during in a one of said smooth mode and said abrupt mode.

2. The control system of claim 1 wherein said control system includes a central processing unit for controlling the operation of said electronic controlled hydraulic valves.

3. The control system of claim 1 wherein said electronic controlled hydraulic valve includes a memory device.

4. The control system of claim 1 further including an activation device that determines said mode of operation by coupling the speed of movement and number of activations thereof to said control module.

5. The control system of claim 1, wherein said mode control module includes a smooth mode module and an abrupt mode module.

6. The control system of claim 5, wherein said smooth mode module and said abrupt mode module condition movement of the bucket according to a control curve having spool displacement versus said activation device displacement.

7. The control system of claim 5, wherein said abrupt mode module is enabled for a pre-determined period of time.

8. A method for conditioning movement of a bucket having an electronic controlled hydraulic valve coupled thereto for controlling the movement of said work implement in response to an operator generated activating signal from an implement controller during a work cycle, the method comprising the steps of:

(a) automatically operating said bucket in a one of a smooth mode and an abrupt mode; and (b) outputting a control signal to said electronic hydraulic valve to control operation of said bucket during one of said smooth mode and said abrupt mode.

9. The method of claim 8, further including the step of disenabling said abrupt work mode after a pre-determined period of time.

10. The method of claim 8 wherein said operator generated activating signal is generated by an operator's movement of a joy stick controller.

11. The control system of claim 1, wherein operation of the bucket in said abrupt mode controls movement of the bucket to perform a shakeout operation.

* * * * *